(12) United States Patent
Mitsutake (10) Patent No.: US 10,459,156 B2
(45) Date of Patent: Oct. 29, 2019

(54) LIGHT GUIDING MEMBER AND ILLUMINATION DEVICE

(71) Applicant: CANON KABUSHIKI KAISHA, Tokyo (JP)

(72) Inventor: Ikutaro Mitsutake, Chikushino (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/162,939

(22) Filed: Oct. 17, 2018

(65) Prior Publication Data

US 2019/0121021 A1 Apr. 25, 2019

(30) Foreign Application Priority Data

Oct. 24, 2017 (JP) .................. 2017-205182

(51) Int. Cl.
*G02B 6/10* (2006.01)
*F21V 8/00* (2006.01)
*H04N 1/028* (2006.01)

(52) U.S. Cl.
CPC ....... *G02B 6/0096* (2013.01); *H04N 1/02855* (2013.01)

(58) Field of Classification Search
CPC ................................................ H04N 1/02855
USPC ....................................................... 362/552
See application file for complete search history.

(56) References Cited

U.S. PATENT DOCUMENTS

| 9,749,493 B2 | 8/2017 | Mitsutake |
| 2015/0060651 A1 | 3/2015 | Yoshida et al. |
| 2016/0212293 A1* | 7/2016 | Ohzawa ................ H04N 1/04 |
| 2018/0309896 A1* | 10/2018 | Sugiyama .......... H04N 1/02855 |

FOREIGN PATENT DOCUMENTS

| JP | H10133026 A | 5/1998 |
| JP | 2005295093 A | 10/2005 |
| JP | 2015050705 A | 3/2015 |

* cited by examiner

*Primary Examiner* — Christopher M Raabe
(74) *Attorney, Agent, or Firm* — Carter, DeLuca & Farrell LLP (57) ABSTRACT

Provided is the light guiding member including an incident surface, an exit surface extending in a first direction, a light guiding surface opposed to the exit surface, and being configured to guide light entering the incident surface to the exit surface, a side surface connecting the exit surface and the light guiding surface, and a held portion formed on the side surface. The light guiding surface includes a plurality of deflection portions arrayed in the first direction. At least one of a density or a depth of each of the plurality of deflection portions differs between a first region on the light guiding surface, which corresponds to a region at which the held portion is present in the first direction, and a second region on the light guiding surface adjacent to each of both sides of the first region in the first direction.

12 Claims, 5 Drawing Sheets

LIGHT GUIDING MEMBER AND ILLUMINATION DEVICE

BACKGROUND OF THE INVENTION

Field of the Invention

The present invention relates to a light guiding member and an illumination device, which are suitable for image reading apparatus such as an image scanner, a copying machine, and a facsimile machine and for image forming apparatus such as a laser beam printer (LBP), a digital copying machine, and a multifunctional printer.

Description of the Related Art

As an illumination device, there is known one in which a light source, for example, a light emitting diode (LED), is arranged at an end portion of an elongated light guiding member in a longitudinal direction thereof.

In such a light guiding member, an uneven structure may be locally formed in a side surface of the light guiding member due to a gate remaining after the light guiding member is manufactured by injection molding or a held portion formed so as to enable the illumination device to hold the light guiding member.

When such an uneven structure is present, light is diffusely reflected on the surface of the uneven structure. Further, when the held portion is formed, after the light exits from the held portion to the outside of the light guiding member, the light enters a holding portion of the illumination device that is holding the light guiding member to cause stray light.

In this manner, intensity distribution of light exiting from the light guiding member, that is, light amount distribution on an illuminated surface, becomes non-uniform.

In Japanese Patent Application Laid-Open No. 2005-295093, there is disclosed a light guiding member in which an uneven structure is painted black so as to reduce such diffused reflection and stray light.

However, when the uneven structure is painted black as disclosed in Japanese Patent Application Laid-Open No. 2005-295093, light is absorbed by the black portion, and thus light use efficiency in the light guiding member is reduced.

SUMMARY OF THE INVENTION

The present invention has an object to provide a light guiding member capable of achieving uniform intensity distribution of light exiting from the light guiding member while maintaining light use efficiency, and an illumination device including the light guiding member.

According to one embodiment of the present invention, there is provided a light guiding member including an incident surface, an exit surface extending in a first direction, a light guiding surface opposed to the exit surface, and being configured to guide light entering the incident surface to the exit surface, a side surface connecting the exit surface and the light guiding surface, and a held portion formed on the side surface, in which the light guiding surface includes a plurality of deflection portions arrayed in the first direction, and at least one of a density or a depth of each of the plurality of deflection portions differs between a first region on the light guiding surface, which corresponds to a region at which the held portion is present in the first direction, and a second region on the light guiding surface adjacent to each of both sides of the first region in the first direction.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Now, light guiding members according to embodiments of the present invention are described in detail with reference to the accompanying drawings. The drawings referred to below may be illustrated in scales different from actual scales in order to facilitate the understanding of the embodiments.

Figure 1:
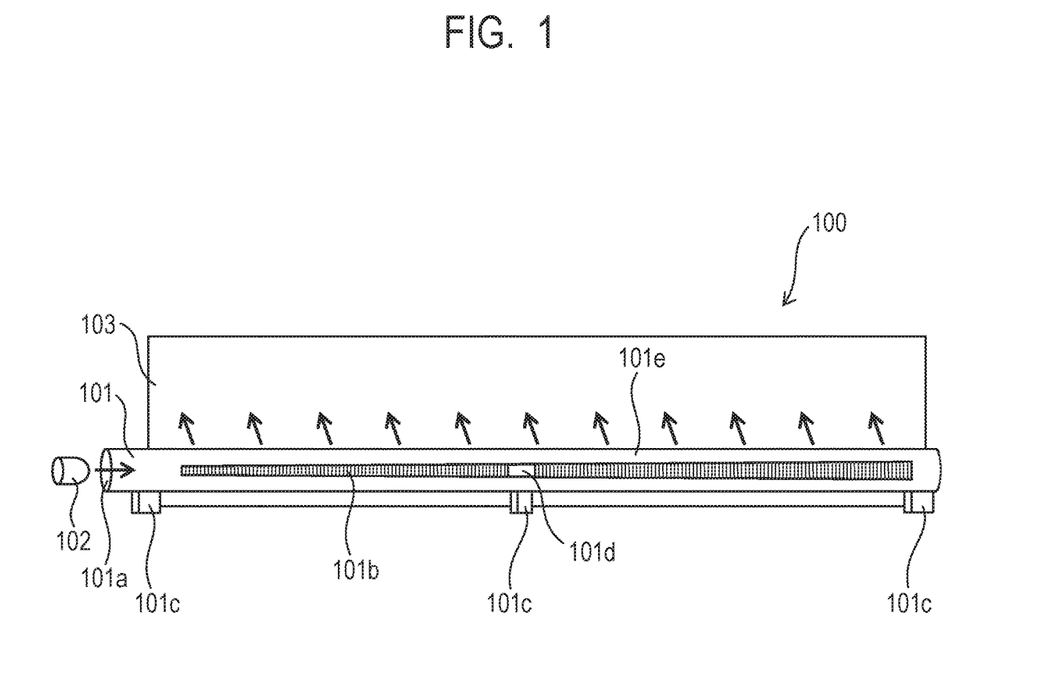
FIG. 1 is a schematic view for illustrating an illumination device including a light guiding member according to a first embodiment of the present invention.

FIG. 1 is a schematic view for illustrating an illumination device 100 including a light guiding member 101 according to a first embodiment of the present invention.

The illumination device 100 includes the elongated light guiding member 101 extending in a first direction (longitudinal direction), and a light source 102 arranged so as to face one end portion of the light guiding member 101 in the first direction. Light beams exiting from the light source 102 enter the light guiding member 101 from an incident surface 101a included in an end surface of the light guiding member 101 in the first direction to be propagated through the inside of the light guiding member 101.

After that, parts of the light beams are reflected at a plurality of reflection portions (deflection portions) 101b formed so as to be arrayed in the first direction on an inner side of a light guiding surface 101f of the light guiding member 101, and are emitted toward an illuminated surface 103 from an exit surface 101e extending in the first direction and being opposed to the light guiding surface 101f.

In this manner, the illuminated surface 103 is illuminated with distribution elongated along the first direction.

Figure 2A:
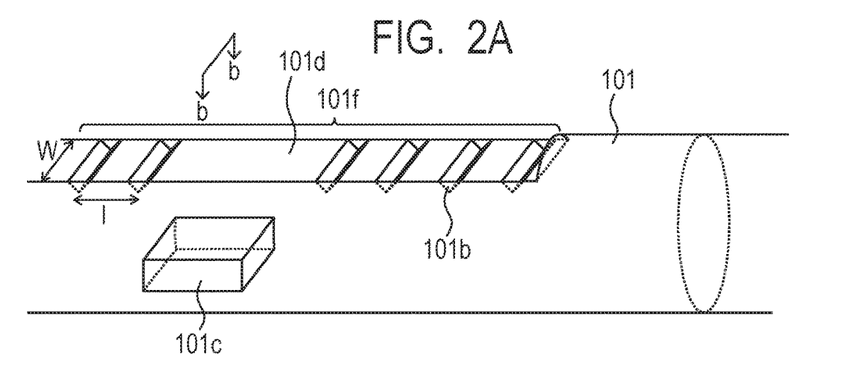
FIG. 2A is an enlarged schematic view for illustrating the light guiding member according to the first embodiment.
Figure 2B:
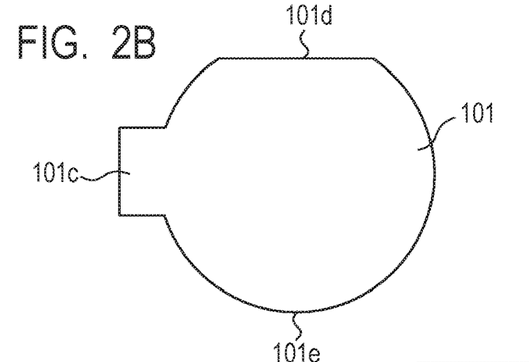
FIG. 2B is an enlarged sectional view taken along the line b-b of FIG. 2A of the light guiding member according to the first embodiment.

FIG. 2A and FIG. 2B are an enlarged schematic view for illustrating the light guiding member 101 according to the first embodiment and an enlarged sectional view taken along the line b-b of FIG. 2A, respectively.

Figure 2C:
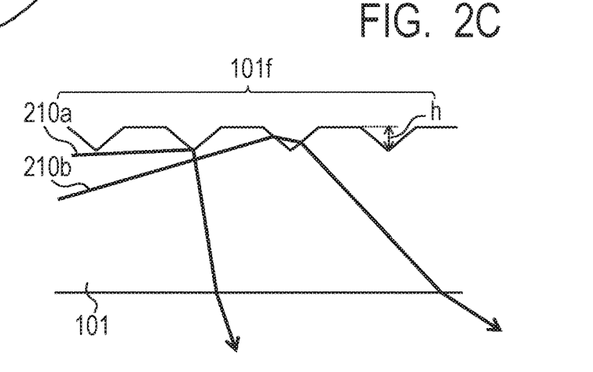
FIG. 2C is an enlarged sectional view for illustrating the light guiding member according to the first embodiment.
Figure 2D:
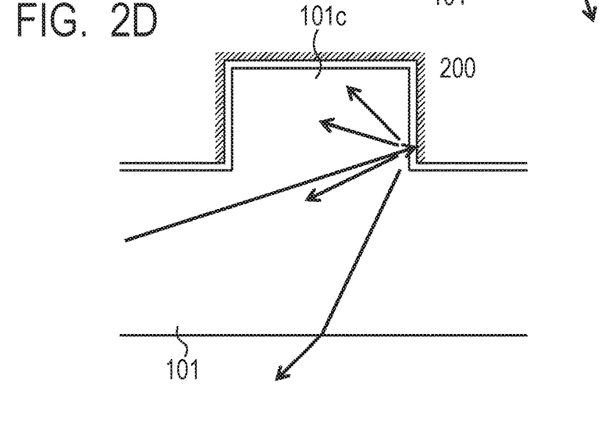
FIG. 2D is an enlarged sectional view for illustrating the light guiding member according to the first embodiment.

Further, FIG. 2C and FIG. 2D are enlarged sectional views for illustrating the light guiding member 101 according to the first embodiment.

The light guiding member 101 according to the first embodiment is manufactured by injection molding with use of a transparent acrylic resin as a material.

As illustrated in FIG. 2A and FIG. 2C, each of the reflection portions 101b has a wedge shape formed of a triangular prism having a bottom surface shaped into a substantially isosceles right triangle in a third direction, which is perpendicular to the first direction, and to a second direction, which is perpendicular to the light guiding surface 101f. With the plurality of reflection portions 101b, an uneven shape is formed in a part of a side surface of the light guiding member 101.

As illustrated in FIG. 2C, the reflection portions 101b reflect parts of light beams propagating through the inside of the light guiding member 101 mainly toward the illuminated surface 103.

Further, as illustrated in FIG. 1 and FIG. 2B, the light guiding member 101 according to the first embodiment includes a plurality of held portions 101c formed so that the light guiding member 101 is held on a side surface (first surface) connecting between the exit surface 101e and the light guiding surface 101f.

In the light guiding member 101 according to the first embodiment, the held portions 101c have a protruding-portion shape protruding radially from the side surface of the light guiding member 101. In other words, the held portions 101c have a convex shape toward an outside of the side surface of the light guiding member 101.

Further, when the light guiding member 101 according to the first embodiment is mounted to the illumination device 100, as illustrated in FIG. 2D, the light guiding member 101 is fixed by inserting the held portion 101c into a holding portion 200 of the illumination device 100. However, the present invention is not limited thereto, and the held portion 101c may be caused to adhere to the holding portion to fix the light guiding member 101. In order to stably hold the light guiding member 101, the held portion 101c (first region 101d) is desired to be arranged at the center of the light guiding surface 101f in the first direction.

As illustrated in FIG. 2C, the reflection portion 101b totally reflects light as a light beam 210a, or as a light beam 210b having a small incident angle, refracts light by one surface of the reflection portion 101b to cause the light to once exit to the outside of the light guiding member 101, and then causes the light to enter the light guiding member 101 again from another surface of the reflection portion 101b to be refracted.

As described above, the plurality of wedge-shaped reflection portions 101b are arranged side by side along the first direction in the side surface of the light guiding member 101. In this manner, the light beams propagating through the inside of the light guiding member 101 can exit to the outside, and a region long in the first direction on the illuminated surface 103 can be illuminated with light.

A width W and a height (depth in an inner direction of the light guiding member 101) "h" of each of the plurality of reflection portions 101b, and an interval I of the plurality of reflection portions 101b are set so that desired light amount distribution can be achieved on the illuminated surface 103.

In this case, the height (depth) of the reflection portion 101b refers to a distance from a side surface of the triangular prism on a radially outer side of the light guiding member 101 to a ridge on a radially inner side along the radial direction. More generally, the depth of the deflection portion refers to a distance between both end portions of the deflection portion in the second direction, which is perpendicular to the light guiding surface.

In the light guiding member 101 according to the first embodiment, as illustrated in FIG. 1, the width W of the reflection portion 101b is increased as the reflection portion 101b is more separated from the incident surface 101a. Meanwhile, as illustrated in FIG. 2A, the height "h" of the reflection portion 101b is constant.

Further, in the light guiding member 101 according to the first embodiment, as illustrated in FIG. 1 and FIG. 2A, the interval I of the plurality of reflection portions 101b is constant except for an anti-reflection portion 101d to be described in detail later.

The width W and the height "h" of each of the plurality of reflection portions 101b and the interval I of the plurality of reflection portions 101b are preferred to be expressed with constant or simple function expressions in terms of design and processing.

For example, there is conceivable a method of expressing a position of an N-th reflection portion 101b counted from the incident surface 101a side or the width W and the height "h" of the N-th reflection portion 101b with a function of N.

When the arrangement and each shape of the plurality of reflection portions 101b are simply expressed with use of functions, time required for design and the number of manufacturing steps can be reduced.

Next, the anti-reflection portion 101d formed in the light guiding member 101 according to the first embodiment is described.

As illustrated in FIG. 2D, in the light guiding member 101 according to the first embodiment, when a light beam enters the held portion 101c, the light beam is diffusely reflected on the surface of the held portion 101c, or exits from the held portion 101c to the outside of the light guiding member 101, and then enters the holding portion 200 having a concave shape (recessed-portion shape) for holding the light guiding member 101. Thus, stray light may be locally caused.

Figure 3:
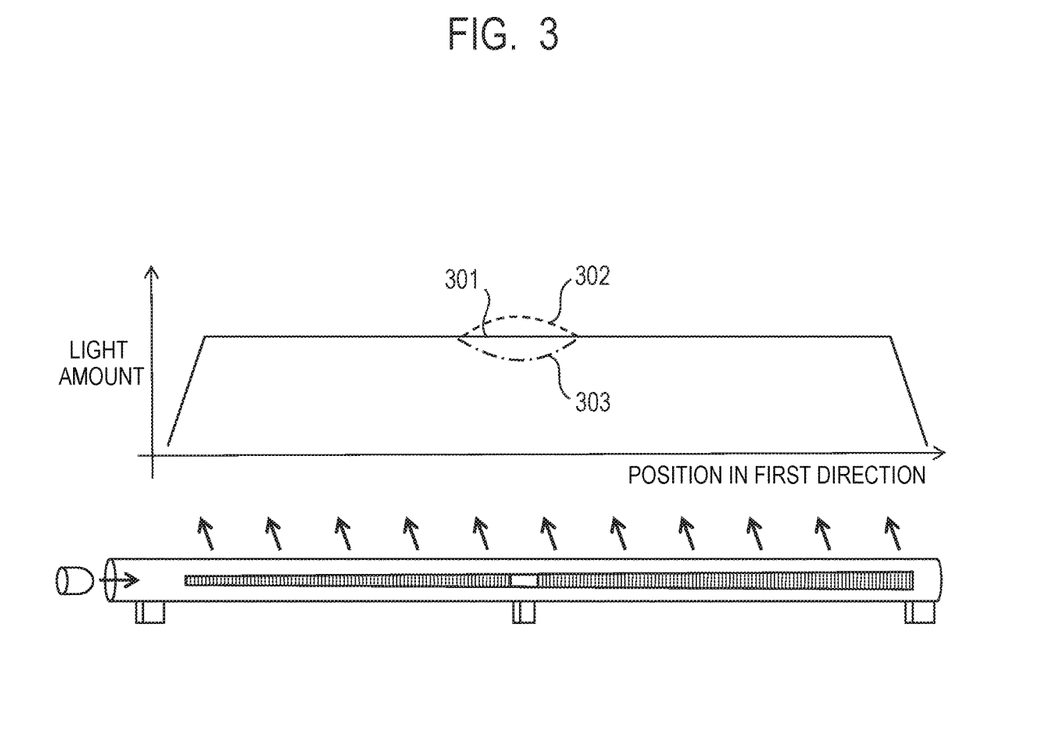
FIG. 3 is a graph for schematically showing light amount distribution at each position on an illuminated surface obtained by the light guiding member according to the first embodiment.

FIG. 3 is a graph for schematically showing light amount distribution at each position along the first direction on the illuminated surface 103 obtained by the light guiding member 101 according to the first embodiment.

That is, as described above, when diffused reflection or stray light is caused by the held portion 101c, as indicated by a broken line 302, the light amount at a position in the first direction at which the held portion 101c is arranged is locally increased.

In view of this, in the light guiding member 101 according to the first embodiment, the anti-reflection portion 101d is formed to reduce this local increase in light amount.

Specifically, in the light guiding member 101 according to the first embodiment, the reflection portion 101b is locally not formed in the first region 101d corresponding to the region at which the held portion 101c is present in the light guiding surface 101f, in which the plurality of reflection portions 101b are formed.

In other words, in the light guiding member 101 according to the first embodiment, between the first region 101d on the light guiding surface 101f and a second region on the light guiding surface 101f adjacent to each of both sides of the first region 101d in the first direction, the density of the plurality of reflection portions 101b differs.

In still other words, when the number of reflection portions 101b per unit length along the first direction is represented by N, and the depth of the reflection portion 101b in the inner direction of the light guiding member 101 is represented by "h", N×h in the first region 101d is smaller than N×h in the second region.

In this manner, as shown in FIG. 3, as indicated by a dashed-dotted line 303, the light amount at the position at which the held portion 101c is present is locally reduced by the anti-reflection portion 101d. As a result, substantially uniform light amount distribution can be obtained along the first direction as indicated by a solid line 301.

As described above, in the light guiding member 101 according to the first embodiment, the density of the plurality of reflection portions 101b differs between the first region 101d and the second region of the light guiding surface 101f. Thus, the local increase in light amount caused by the held portion 101c can be suppressed, and substantially uniform light amount distribution can be obtained.

In the light guiding member 101 according to the first embodiment, a part of the side surface of the cylindrical light guiding member 101 is formed into a shape of a flat surface, and the plurality of reflection portions 101b having a triangular prism shape are formed on the flat surface, but the present invention is not limited thereto. A plurality of curved reflection portions may be formed along the curved side surface.

Further, in the light guiding member 101 according to the first embodiment, the depth of the reflection portion 101b is uniform in the first region and the second region, but the present invention is not limited thereto. The depth may be non-uniform. In this case, an average depth obtained by averaging the depths of the plurality of reflection portions in each region may be used.

Second Embodiment

Figure 4:
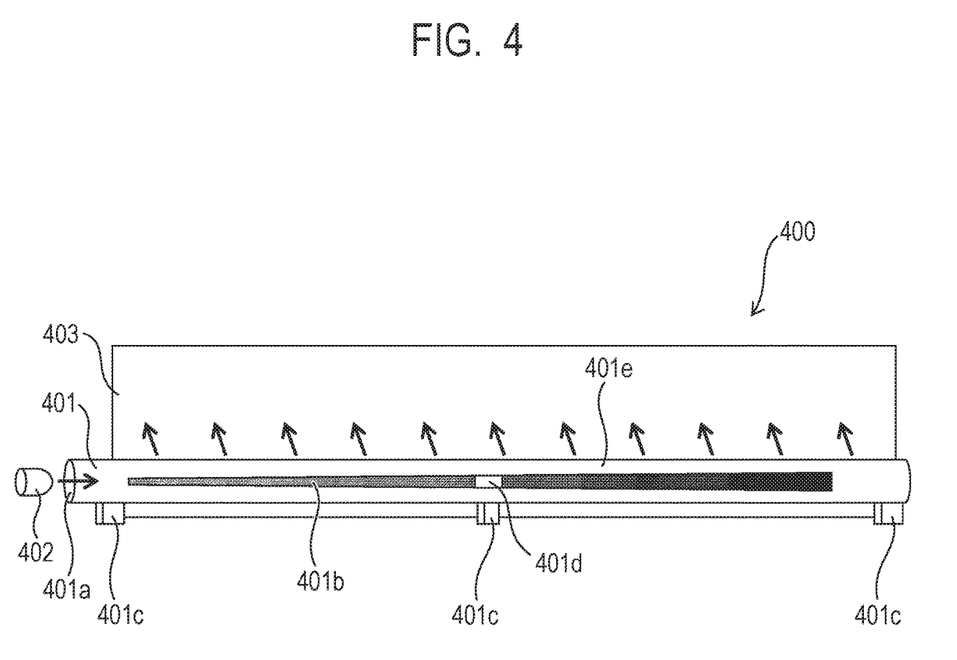
FIG. 4 is a schematic view for illustrating an illumination device including a light guiding member according to a second embodiment of the present invention.

FIG. 4 is a schematic view for illustrating an illumination device 400 including a light guiding member 401 according to a second embodiment of the present invention.

Figure 5:
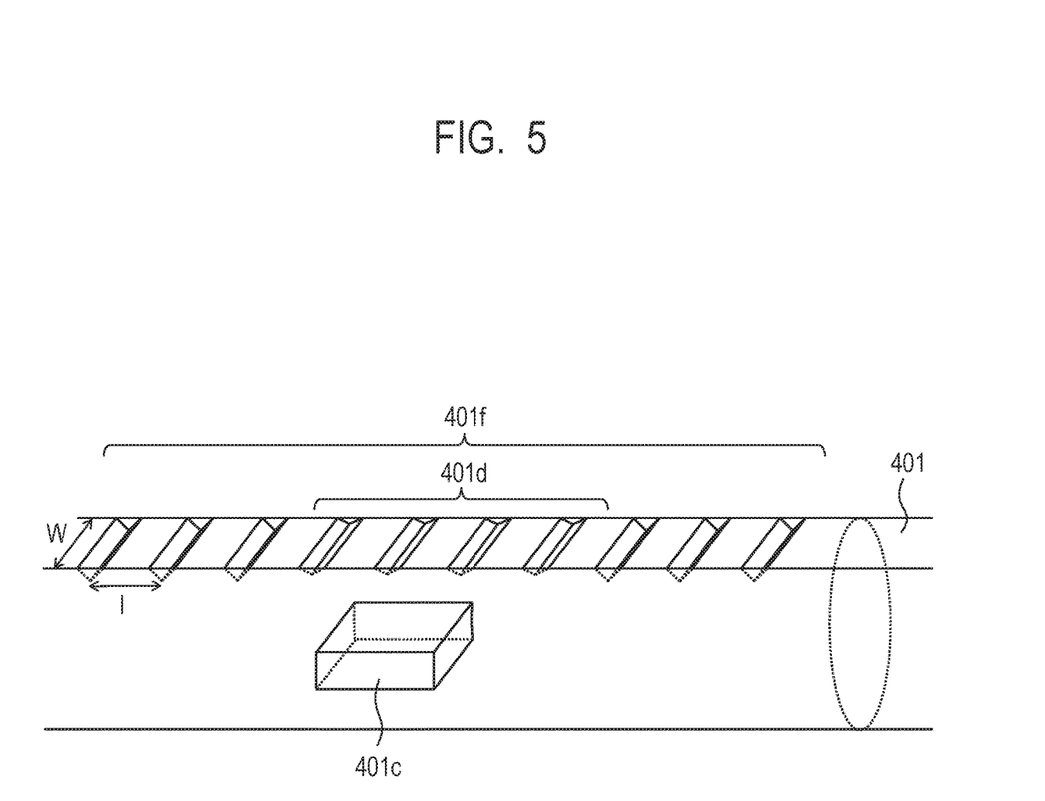
FIG. 5 is an enlarged schematic view for illustrating the light guiding member according to the second embodiment.

Further, FIG. 5 is an enlarged schematic view for illustrating the light guiding member 410 according to the second embodiment.

The illumination device 400 includes the elongated light guiding member 401 extending in the first direction, and a light source 402 arranged so as to face one end portion of the light guiding member 401 in the first direction. Light beams exiting from the light source 402 enter the light guiding member 401 from an incident surface 401a included in an end surface of the light guiding member 401 in the first direction to be propagated through the inside of the light guiding member 401.

After that, parts of the light beams are reflected at a plurality of reflection portions (deflection portions) 401b formed so as to be arrayed in the first direction on an inner side of a light guiding surface 401f of the light guiding member 401, and are emitted toward an illuminated surface 403 from an exit surface 401e extending in the first direction and being opposed to the light guiding surface 401f.

In this manner, the illuminated surface 403 is illuminated with distribution elongated along the first direction.

The light guiding member 401 according to the second embodiment is manufactured by injection molding with use of a transparent acrylic resin as a material.

As illustrated in FIG. 5, each of the reflection portions 401b has a wedge shape formed of a triangular prism having a bottom surface shaped into an isosceles triangle in the third direction, which is perpendicular to the first direction and to the second direction, which is perpendicular to the light guiding surface 401f. With the plurality of reflection portions 401b, an uneven shape is formed in a part of a side surface of the light guiding member 401.

The reflection portions 401b reflect parts of light beams propagating through the inside of the light guiding member 401 mainly toward the illuminated surface 403.

Further, as illustrated in FIG. 4 and FIG. 5, the light guiding member 401 according to the second embodiment includes a plurality of held portions 401c formed so that the light guiding member 401 is held on a side surface (first surface) connecting between the exit surface 401e and the light guiding surface 401f.

In the light guiding member 401 according to the second embodiment, the held portions 401c have a protruding-portion shape protruding radially from the side surface of the light guiding member 401. In other words, the held portions 401c have a convex shape toward an outside of the side surface of the light guiding member 401.

In the light guiding member 401 according to the second embodiment, as illustrated in FIG. 4, the width W of the reflection portion 401b is increased as the reflection portion 401b is more separated from the incident surface 401a.

Meanwhile, in the light guiding member 401 according to the second embodiment, the interval I of the plurality of reflection portions 401b is decreased as the reflection portions 401b are more separated from the incident surface 401a (expressed with the degree of shading in FIG. 4).

Of the light beams entering the light guiding member 401 from the incident surface 401a, light beams reaching a position separated from the incident surface 401a along the first direction are reduced, and hence the light exiting intensity is reduced as the distance from the incident surface 401a is increased.

Therefore, in order to obtain uniform light amount distribution, the interval I of the plurality of reflection portions 401b is decreased as the reflection portions 401b are more separated from the incident surface 401a.

Further, in the light guiding member 401 according to the second embodiment, as illustrated in FIG. 5, the height "h" is constant except for an anti-reflection portion 401d.

That is, in the light guiding member 401 according to the second embodiment, in the first region 401d corresponding to the region at which the held portion 401c is present in the light guiding surface 401f, the height "h" is set to 0.25 mm. Meanwhile, in the second region, which is different from the first region 401d, the height "h" is doubled to 0.5 mm.

In other words, in the light guiding member 401 according to the second embodiment, the depth of the reflection portion 401b in the inner direction of the light guiding member 401 differs between the first region 401d on the light guiding surface 401f and the second region on the light guiding surface 401f, which is different from the first region 401d.

In still other words, when the number of reflection portions 401b per unit length along the first direction is represented by N, and the depth of the reflection portion 401b in the inner direction of the light guiding member 401 is represented by "h", N×h in the first region 401d is smaller than N×h in the second region.

In this manner, similarly to the first embodiment, the light amount at the position at which the held portion 401c is arranged is locally reduced by the anti-reflection portion 401d. As a result, substantially uniform light amount distribution can be obtained along the first direction.

As described above, in the light guiding member 401 according to the second embodiment, the depth of the reflection portion 401b in the inner direction of the light guiding member 401 differs between the first region 401d and the second region of the light guiding surface 401f.

Thus, the local increase in light amount caused by the held portion 401c can be suppressed, and substantially uniform light amount distribution can be obtained.

Although the exemplary embodiments of the present invention have been described above, the present invention is not limited to those embodiments, and various changes and modifications can be made thereto within the scope of the gist of the present invention.

In the above-mentioned embodiments, a protrusion is exemplified as the held portion, but the present invention is not limited thereto. The above-mentioned configuration can be applied even when the held portion has a recessed shape as long as the structure is formed for holding, positioning, or fixing.

Further, the above-mentioned configuration can be applied to a gate or a parting line remaining after molding.

The illumination device including the light guiding member according to the above-mentioned first or second embodiment can be used in an image reading apparatus.

Specifically, there is considered an image reading apparatus including the illumination device including the light guiding member according to the first or second embodiment, a light receiving portion configured to receive light from the illuminated surface, and an imaging portion configured to guide the light from the illuminated surface to the light receiving portion.

Light emitted from the illumination device is diffusely reflected on an original surface of an original arranged at a position of the illuminated surface, and is focused on a light receiving surface of the light receiving portion by an imaging optical system. Then, a drive portion moves a carriage integrally holding the illumination device, the imaging optical system, and the light receiving portion. Thus, the original surface of the original can be sequentially read by the carriage in one direction. In this manner, the light receiving portion can read image information on the entire original surface of the original in a line sequential system.

Further, the illumination device including the light guiding member according to the above-mentioned first or second embodiment can be used in an image forming apparatus.

Specifically, there is considered an image forming apparatus including the illumination device serving as a charge eliminating unit configured to illuminate a scanned surface to eliminate charges, an optical scanning apparatus configured to scan the scanned surface, a developing device configured to develop an electrostatic latent image formed on the scanned surface by the optical scanning apparatus as a toner image, a transfer device configured to transfer the developed toner image onto a transferred material, and a fixing device configured to fix the transferred toner image to the transferred material.

Code data input from an external apparatus to the image forming apparatus is converted into image data (dot data) by a printer controller in the image forming apparatus so as to be input to the optical scanning apparatus. Then, the optical scanning apparatus emits light beams modulated in accordance with the image data so that the light beams scan a photosensitive surface of a photosensitive drum arranged at a position of the scanned surface in a main scanning direction.

The photosensitive drum serving as an electrostatic latent image bearing member (photosensitive body) is rotated, and the charges on the surface of the photosensitive drum are eliminated by light irradiation of the illumination device including the light guiding member according to the first or second embodiment, that is, the photosensitive drum is electrically initialized (pre-exposure). Then, the surface of the photosensitive drum is uniformly charged by a charging roller, and the charged surface of the photosensitive drum is irradiated with light beams scanned by the optical scanning apparatus.

The light beams are modulated based on the image data, and with the irradiation of the light beams, an electrostatic latent image is formed on the surface of the photosensitive drum. The electrostatic latent image is developed by the developing device as the toner image.

The toner image developed by the developing device is transferred onto a sheet serving as the transferred material by a transfer roller (transfer device) arranged so as to be opposed to the photosensitive drum.

The sheet having the unfixed toner image transferred thereon as described above is conveyed to the fixing device, and the unfixed toner image on the sheet is fixed in the fixing device.

As described above, the illumination device including the light guiding member according to the first or second embodiment can provide substantially uniform light amount distribution, and hence charges on the surface of the photosensitive drum can be uniformly eliminated, that is, potential unevenness (charging unevenness) can be reduced in the pre-exposure.

According to the present invention, it is possible to provide the light guiding member capable of achieving uniform intensity distribution of light exiting from the light guiding member while maintaining the light use efficiency, and the illumination device including the light guiding member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-205182, filed Oct. 24, 2017, which is hereby incorporated by reference herein in its entirety.

What is claimed is:

1. A light guiding member comprising:
    an incident surface;
    an exit surface extending in a first direction;
    a light guiding surface opposed to the exit surface, and being configured to guide light entering the incident surface to the exit surface;
    a side surface connecting the exit surface and the light guiding surface; and
    a held portion formed on the side surface,
    wherein the light guiding surface includes a plurality of deflection portions arrayed in the first direction, and
    wherein at least one of a density or a depth of each of the plurality of deflection portions differs between a first region on the light guiding surface, which corresponds to a region at which the held portion is present in the first direction, and a second region on the light guiding surface adjacent to each of both sides of the first region in the first direction.

2. A light guiding member according to claim 1, wherein the first region is positioned at a center of the light guiding surface in the first direction.

3. A light guiding member according to claim 1, wherein, when a number of deflection portions per unit length along the first direction is represented by N, and an average depth of the plurality of deflection portions is represented by "h", N×h in the first region is smaller than N×h in the second region.

4. A light guiding member according to claim 1, wherein each of the plurality of deflection portions includes a reflection portion configured to reflect light entering the incident surface.

5. A light guiding member according to claim 1, wherein each of the plurality of deflection portions has a wedge shape formed of a triangular prism having a bottom surface in a third direction, which is perpendicular to the first direction, and to a second direction, which is perpendicular to the light guiding surface.

6. A light guiding member according to claim 1, wherein the held portion protrudes from the side surface.

7. An illumination device comprising:
   a light source; and
   the light guiding member according to claim 1, which is configured to guide light from the light source to an illuminated surface.

8. An illumination device according to claim 7, wherein the light source is provided so as to face only one end portion of the light guiding member in the first direction.

9. An illumination device according to claim 7, further comprising a holding portion configured to hold the held portion.

10. An illumination device according to claim 9, wherein the holding portion has a concave shape, to which the held portion is to be inserted.

11. An image reading apparatus comprising:
    the illumination device according to claim 7;
    a light receiving portion configured to receive light from the illuminated surface; and
    an imaging portion configured to guide light from the illuminated surface to the light receiving portion.

12. An image forming apparatus comprising:
    the illumination device according to claim 7, which is configured to illuminate a scanned surface so as to eliminate charges;
    an optical scanning apparatus configured to scan the scanned surface;
    a developing device configured to develop an electrostatic latent image formed on the scanned surface as a toner image;
    a transfer device configured to transfer the developed toner image onto a transferred material; and
    a fixing device configured to fix the transferred toner image to the transferred material.

* * * * *